United States Patent

[11] 3,526,182

| [72] | Inventors | Dieter Engelsmann<br>Unterhaching near Munich, Germany;<br>Hubert Hackenberg, Munich-Solln,<br>Germany |
|---|---|---|
| [21] | Appl. No. | 710,867 |
| [22] | Filed | March 6, 1968 |
| [45] | Patented | Sept. 1, 1970 |
| [73] | Assignee | Agfa-Gevaert Aktiengesellschaft<br>Leverkusen, Germany |
| [32] | Priority | March 9, 1967 |
| [33] |  | Germany |
| [31] |  | No. A55106 |

[54] ELECTROMAGNETICALLY OPERATED SHUTTER FOR PHOTOGRAPHIC CAMERA
12 Claims, 1 Drawing Fig.

[52] U.S. Cl. .................................................. 95/60, 95/64
[51] Int. Cl. ..................................................... G03b 9/26
[50] Field of Search .......................................... 95/60, 62, 58, 53, 59, 64D, 63, 10C

[56]  References Cited
UNITED STATES PATENTS

| 3,165,996 | 1/1965 | Kiper et al. ................... | 95/63X |
| 3,203,331 | 8/1965 | Hofmann ...................... | 95/64 |
| 3,358,575 | 12/1967 | Kitai ............................ | 95/63 |

Primary Examiner—Norton Ansher
Assistant Examiner—Richard L. Moses
Attorney—Michael S. Striker ABSTRACT: A shutter for photographic cameras which comprises a leading blade which covers the exposure aperture in cocked position and a trailing blade which exposes different areas of the aperture in cocked position. The cocked position of the trailing blade can be changed by the focussing mechanism when the camera is set for operation in artificial light. When the camera is set for operation in daylight, the trailing blade fully exposes the aperture in response to movement to cocked position. The exposure values are then selected as a function of scene brightness.

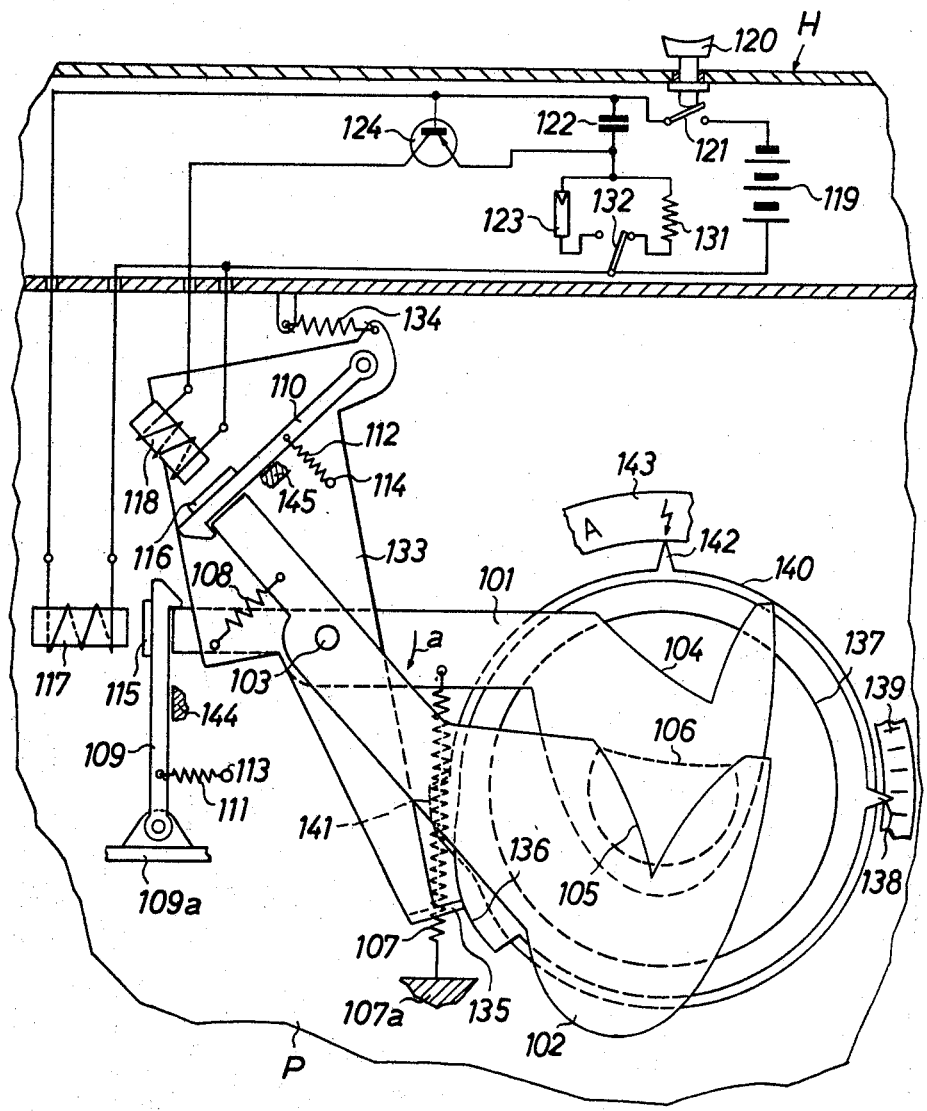

3,526,182

ELECTROMAGNETICALLY OPERATED SHUTTER FOR PHOTOGRAPHIC CAMERA

CROSS-REFERENCE TO RELATED APPLICATION

The shutter of this invention constitutes an improvement over and a further development of the shutter which is disclosed in our copending application Ser. No. 664,410 filed August 30, 1967.

BACKGROUND OF THE INVENTION

The present invention relates to shutters for photographic cameras, and more particularly to improvements in shutters of the type wherein a leading blade moves from cocked position to admit scene light to an unexposed film frame and wherein a trailing blade moves from cocked position to terminate the admission of light with a variable delay following movement of the leading blade. Still more particularly, the invention relates to improvements in shutters wherein the delay with which the trailing blade follows the movement of leading blade from cocked position can be determined automatically as a function of scene brightness when the camera is set for operation in daylight.

Our aforementioned copending application Ser. No. 664,410 discloses a shutter wherein the trailing blade is released for movement from cocked position in response to energization of an electromagnet which is in circuit with a photosensitive receiver. Both blades are turnable about a common pivot axis and can be cocked in response to actuation of the film transporting mechanism.

SUMMARY OF THE INVENTION

It is an object of our invention to provide a shutter with two blades which can be used for operation in daylight to determine exposure values as a function of scene brightness as well as in artificial light.

Another object of the invention is to provide a shutter which also acts as a diaphragm and can change the aperture size as a function of the distance from the subject when the camera is set for operation in artificial light.

A further object of the invention is to provide a shutter wherein the effective size of the aperture for operation in artificial light can be changed and properly selected in automatic response to manipulation of the focussing mechanism.

An additional object of the invention is to provide a novel adjusting arrangement for the trailing blade in a shutter of the above outlined character.

Still another object of the invention is to provide a shutter wherein the automatic photosensitive exposure control is disconnected or rendered inactive in response to setting of the camera for operation in artificial light.

The improved shutter comprises means defining an exposure aperture, leading and trailing shutter blade means movable to and from cocked positions in which they respectively cover and uncover at least a portion of the aperture, and adjusting means for selecting the cocked position of the trailing blade means as a function of the distance from the subject or scene when the camera which embodies the shutter is set for operation in artificial light so as to determine the extent to which the trailing blade means uncovers the exposure aperture in cocked position.

The adjusting means preferably comprises a carrier which supports the trailing blade means and is movable between plural positions by a focussing mechanism. The latter may include a ring which is turnable about the optical axis between several positions each of which is indicative of a different distance from the subject or scene. The carrier may resemble a lever which is pivotable about a fixed axis, and at least the trailing blade means can be arranged to pivot about the same axis during movement to or from cocked position.

The camera is further provided with selector means for disengaging the carrier from the focussing mechanism and for maintaining the carrier in a predetermined position in which the trailing blade means uncovers a predetermined portion of the aperture when it assumes the cocked position.

The novel features which are considered as characteristic of the invention are set forth in particular in the appended claims. The improved shutter itself, however, both as to its construction and its mode of operation, together with additional features and advantages thereof, will be best understood upon perusal of the following detailed description of a specific embodiment with reference to the accompanying drawing.

BRIEF DESCRIPTION OF THE DRAWING

The single figure is a schematic vertical sectional view of a still camera which embodies the improved shutter.

DESCRIPTION OF THE PREFERRED EMBODIMENT

The shutter of our invention is installed in a photographic camera which comprises a housing H accommodating a plate P defining an exposure aperture 106. Two shutter blades 101, 102 are turnable about a fixed axis defined by a pivot pin 103 which is mounted on the plate P or on another part of the housing H. The blades 101, 102 are turnable independently of each other from cocked positions which are shown in the drawing. When in cocked position, the leading blade 101 overlies the aperture 106 so as to prevent scene light from reaching an unexposed film frame. The other or trailing shutter blade 102 exposes a portion of or the entire aperture 106 when it assumes the cocked position shown in the drawing. Springs 107, 108 are provided to bias the blades 101, 102 from cocked positions. The spring 107 operates between the right-hand arm of the leading blade 101 and a stationary retainer 107a in the housing H and tends to pivot the blade 101 in a clockwise direction (arrow a) so as to place a substantially triangular cutout or notch 104 of this blade into registry with the aperture 106. The trailing blade 102 has a substantially triangular cutout or notch 105 which registers with the aperture 106 when the blade 102 is held in cocked position. The spring 108 operates between the left-hand arm of the blade 102 and a plate-like carrier 133 which forms part of an adjusting device for the trailing blade and is pivotable on the pin 103 between a plurality of positions which can be selected as a function of the angular position of a ring-shaped focussing member 137 and a further position which the carrier 133 assumes when it is disengaged from the focussing member.

The shutter further comprises two blocking pawls 109, 110 which are biased by springs 111, 112 and tend to maintain the blades 101, 102 in cocked positions. The blocking pawl 109 for the leading blade 101 is pivotable with reference to a bracket 109a which is affixed to the housing H and the spring 111 maintains it in abutment with a fixed stop 144 when the blade 101 is cocked. One end of the spring 111 is attached to a post 113 in the housing H. The other blocking pawl 110 is pivotably mounted on the carrier 133 and one end of its spring 112 is attached to a post 114 of the carrier. When the trailing blade 102 assumes the cocked position which is shown in the drawing, the pawl 110 abuts against a stop 145 on the carrier 133.

The pawls 109, 110 respectively carry platens 115, 116 of magnetizable material. These platens constitute the armatures of two electromagnets 117, 118 which in turn form part of an exposure control in the camera and serve to effect release of blades 101, 102 for movement to uncocked positions. The electromagnet 118 for the trailing blade 102 can effect release of this blade subsequent to release of the leading blade 101 with a delay which is a function of scene brightness when the camera is set for operation in daylight or with a predetermined delay when the camera is set for operation in artificial light, e.g., with light furnished by an electronic flash or by one or more flash bulbs.

The electric circuit which includes the electromagnets 117, 118 is illustrated in the upper portion of the drawing. This circuit further comprises one or more batteries 119 or another suitable source of electrical energy in series with a normally open master switch 121, a capacitor 122 and one of two resistors 123, 131. The resistor 123 is a photosensitive resistor and is exposed to scene light. The resistor 131 is a fixed resistor and can be disconnected from the capacitor 122 and battery 119 by a control switch 132 which then connects the battery and capacitor with the photosensitive resistor 123. The master switch 121 can be closed by a shutter release 120 which extends beyond the top wall of the housing H and can be depressed by hand. The electromagnet 118 is connected in parallel with the resistor 123 or 131 and in series with a triode 124. The emitter of the triode 124 is connected to a junction between the capacitor 122 and resistors 123, 131. The electromagnet 117 is connected directly with the master switch 121 and battery 119.

The carrier 133 can be turned on the pin 103 independently of the leading blade 101 and can turn the trailing blade 102 so as to move the latter into one of several positions as a function of the setting of the aforementioned focussing member 137 or to a further position when the camera is set for operation in daylight. The focussing member 137 is turnable about the optical axis of the objective and has a cam 136 which engages with a follower 135 of the carrier 133. A spring 134 which operates between the upper arm of the carrier 133 and the housing H biases the follower 135 against the face of the cam 136. An index 138 of the focussing member 137 is movable along a fixed scale 139 which is graduated to indicate various distances from the subject.

A ring-shaped selector 140 is rotatable about the optical axis and has a cam 141 which can engage the follower 135 to thus disengage the carrier 133 from the focussing member 137. This takes place when the camera is set for operation in daylight, i.e., when the control switch 132 connects the photoelectric resistor 123 in circuit with the capacitor 122 and battery 119. The selector 140 has an index 142 which can register with one of two symbols on a fixed scale 143. The thunderbolt symbol on the scale 143 indicates that the camera is set for operation with artificial illumination of the subject. The selector 140 is preferably coupled with the control switch 132 in such a way that the latter automatically connects the fixed resistor 131 in circuit with the capacitor 122 when the index 142 registers with the thunderbolt symbol. When this index 142 registers with the symbol A on the scale 143, the camera is set for operation in daylight with automatic selection of exposure values as a function of scene brightness. The selector 140 then maintains the control switch 132 in the other end position in which the photoelectric resistor 123 is connected in circuit with the capacitor 122.

The means for moving the shutter blades 101, 102 to the illustrated cocked positions is not shown in the drawing. Such cocking means may derive motion from the film transporting mechanism, for example, in a manner as shown and described in our copending application Ser. No. 664,410.

The operation is as follows:

The drawing shows the selector 140 in a position in which it sets the camera for operation in artificial light with automatic determination of exposure time as a function of the distance from the subject or scene, and more particularly as a function of the setting of the focussing member 137. By turning the focussing member about the optical axis, the user causes the cam 136 to change the angular position of the carrier 133 and to thus change the initial position of the trailing blade 102 as a function of the angular position of the focussing member. The position of the right-hand arm of the blade 102 with reference to the aperture 106 changes so that the blade 102 uncovers or exposes a larger or smaller portion of the aperture.

In order to make an exposure in artificial light, the user then depresses the shutter release 120 to close the master switch 121. The electromagnet 117 is energized in immediate response to closing of the master switch 121 and attracts the armature 115 to thus disengage the pawl 109 from the leading blade 101. The latter follows the bias of the spring 107 and turns in a clockwise direction (arrow a) so as to place its cutout 104 into registry with the aperture 106 and to admit scene light to the film frame which is located behind the aperture. The effective size of the aperture 106 depends on the position of the cutout 105 in the cocked position of the trailing blade 102, i.e., on the angular position of the focussing member 137 and carrier 133.

When the shutter release 120 closes the master switch 121, the capacitor 122 is being charged by way of the fixed resistor 131. When the potential difference between the plates of the capacitor 122 rises to a predetermined value, the triode 124 begins to conduct current and energizes the electromagnet 118 on the carrier 133. This electromagnet attracts the armature 116 and causes the pawl 110 to release the trailing blade 102 for movement to uncocked position in which the trailing blade overlies the aperture 106 and thus terminates the exposure. The delay with which the electromagnet 118 is energized following energization of the electromagnet 117 depends on the resistance of the fixed resistor 131. Thus, by selecting the resistance of this resistor 131, the designer of the camera can determine in advance the exposure time during exposures with artificial illumination of the subject. The aperture size is determined by the focussing member 137. During movement to uncocked position, the trailing blade 102 turns in a counterclockwise direction. Suitable stops (not shown) can be provided to arrest the blades 101, 102 in uncocked positions. Such stops may form part of a movable cocking device.

If an exposure is to be made in daylight, the user turns the selector 140 in a counterclockwise direction to place the index 142 into registry with the symbol A and to connect the photoelectric resistor 123 in circuit with the capacitor 122. The cam 141 of the selector 140 then disengages the follower 135 from the cam 136 of the focussing member 137 so that the carrier 133 assumes a predetermined angular position in which it remains during one or more exposures in daylight, i.e., as long as the index 142 registers with the symbol A, The cam 141 turns the carrier 133 in a clockwise direction (arrow a) and preferably to a predetermined position in which the trailing blade 102 fully exposes the aperture 106 as long as it remains in cocked position.

The user then depresses the shutter release 120 to complete the circuit of the capacitor 122. This capacitor is charged to a predetermined potential difference with a delay which is a function of scene brightness so that the electromagnet 118 is energized with a delay which is also a function of scene brightness. When the intensity of scene light is very high, the electromagnet 117 is energized with a very short delay to furnish a short exposure time. The delay can be so short that the blade 102 is released for movement to uncocked position before the leading blade 101 reaches its uncocked position. In this way, the blades 101, 102 can define an effective aperture whose size is less than the size of the aperture 106.

The shutter which is shown in the drawing can be modified without departing from the spirit of our invention. For example, the blades 101, 102 can be mounted for reciprocatory movement and the parts 137, 140 can be arranged to reciprocate the carrier 133 with reference to the housing. Also, the leading blade 101 can be mechanically disengaged from the blocking pawl 109 in response to depression of the shutter release 120. The selector 140 need not be concentric with the focussing member 137 and the blades 101, 102 can be cocked independently of the film transporting mechanism.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

We claim:

1. In a shutter for photographic cameras, a combination comprising means defining an exposure aperture; leading blade means movable to and from cocked position in which it respectively covers and uncovers at least a portion of said aperture; trailing blade means movable from a plurality of different cocked positions in which it uncovers different portions of said aperture to an uncocked position in which it covers said aperture; and adjusting means for moving said trailing blade means into one of said cocked positions thereof as a function of the distance from the subject so as to determine the extent to which said trailing blade means uncovers said aperture in cocked position thereof.

2. A combination as defined in claim 1, wherein said adjusting means comprises focussing means movable between a plurality of positions each of which is indicative of a different distance from the subject, and carrier means receiving motion from said focussing means and supporting said trailing blade means.

3. A combination as defined in claim 2, further comprising electromagnet means mounted on said carrier means and energizable to initiate movement of said trailing blade means from cocked position.

4. A combination as defined in claim 3, further comprising blocking means arranged to normally hold said trailing blade means in cocked position and to release said trailing blade means for movement from cocked position in response to energization of said electromagnet means, said blocking means being mounted on said carrier means.

5. A combination as defined in claim 2, wherein said carrier means is turnable about a fixed axis.

6. A combination as defined in claim 5, wherein at least said trailing blade means is arranged to turn about said fixed axis during movement to or from cocked position.

7. A combination as defined in claim 2, wherein said focussing means comprises cam means and said carrier means comprises follower means tracking said cam means, and further comprising means for biasing said follower means against said cam means.

8. A combination as defined in claim 2, further comprising selector means for disengaging said carrier means from said focussing means and for maintaining said carrier means in a predetermined position in which said trailing blade means uncovers a predetermined portion of said aperture in the cocked position thereof.

9. A combination as defined in claim 8, further comprising means for effecting movement of said trailing blade means from cocked position subsequent to movement of said leading blade means from cocked position with a delay which is a function of scene brightness when said selector means maintains said carrier means in said predetermined position.

10. A combination as defined in claim 2, further comprising means for effecting movement of said trailing blade means from cocked position with a predetermined delay following movement of said leading blade means from cocked position.

11. A combination as defined in claim 2, further comprising means for biasing said blade means from cocked positions.

12. A combination as defined in claim 2, further comprising means for disengaging said carrier means from said focussing means in response to setting of the camera for operation in daylight, the camera being set for operation in artificial light when said carrier means engages with said focussing means.